(12) United States Patent
Kang et al.

(10) Patent No.: US 8,731,108 B2
(45) Date of Patent: May 20, 2014

(54) COMMUNICATION SYSTEM FOR RECOGNIZING TYPE OF NOISE SOURCE

(75) Inventors: Joon Seong Kang, Seoul (KR); Hyo Sun Hwang, Seoul (KR); Chan Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 13/177,490

(22) Filed: Jul. 6, 2011

(65) Prior Publication Data

US 2012/0114061 A1 May 10, 2012

(30) Foreign Application Priority Data

Nov. 10, 2010 (KR) .................. 10-2010-0111386

(51) Int. Cl.
*H03C 3/00* (2006.01)
(52) U.S. Cl.
USPC ............ 375/303; 375/211; 375/272; 375/334
(58) Field of Classification Search
CPC ....... H04L 27/12; H04L 27/122; H04L 27/10; H04L 27/2017; H04L 27/2025
USPC .................. 375/259, 285, 303, 211, 272, 334
See application file for complete search history.

(56) References Cited

U.S. PATENT DOCUMENTS

| 3,987,374 A * | 10/1976 | Jones, Jr. ................ 332/101 |
| 7,733,937 B2 | 6/2010 | Arslan |
| 2004/0125889 A1 | 7/2004 | Cumeralto et al. |
| 2010/0020863 A1 | 1/2010 | Shi et al. |

FOREIGN PATENT DOCUMENTS

| KR | 10-2004-0078835 | 9/2004 |
| KR | 10-2007-0082373 | 8/2007 |
| WO | WO 99/39444 A1 | 8/1999 |
| WO | WO 2005/015814 A1 | 2/2005 |

OTHER PUBLICATIONS

Search report dated Feb. 6, 2012, in counterpart European Patent Application No. 11183796.9 (in English, 7 pages).

* cited by examiner

*Primary Examiner* — Dhaval Patel
(74) *Attorney, Agent, or Firm* — NSIP Law

(57) ABSTRACT

Provided is a communication system that includes setting a detection threshold according to a distribution of at least one logic value of a transmission signal corresponding to an on-off keying (OOK) scheme or a frequency shift keying (FSK) scheme, and determining a type of noise source influencing a reception signal using the detection threshold and the distribution of at least one logic value.

16 Claims, 13 Drawing Sheets

FIG. 2
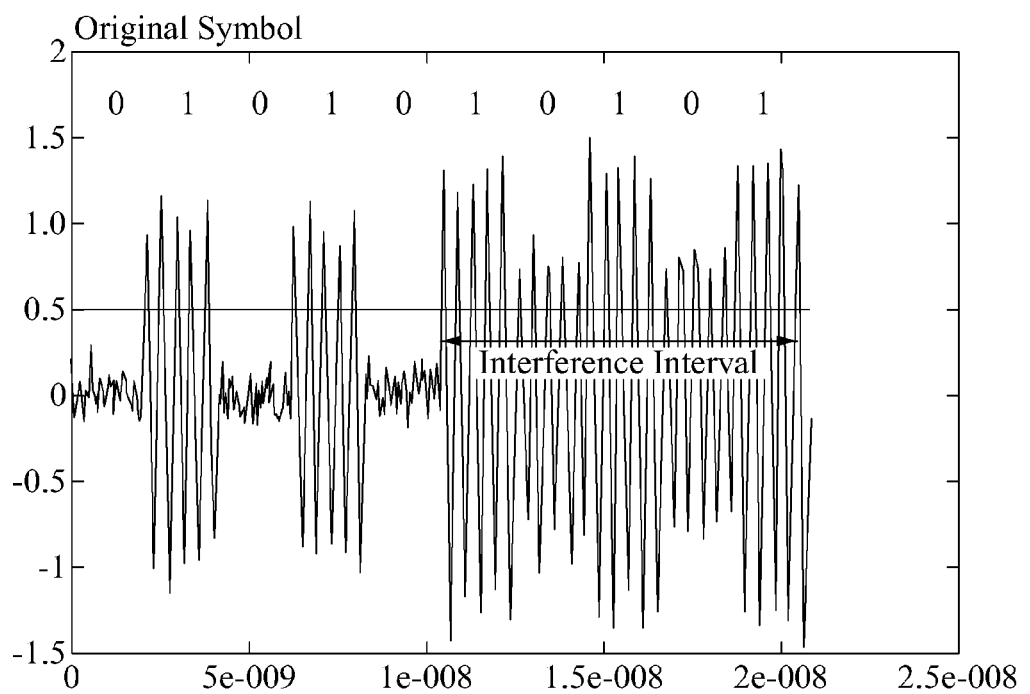
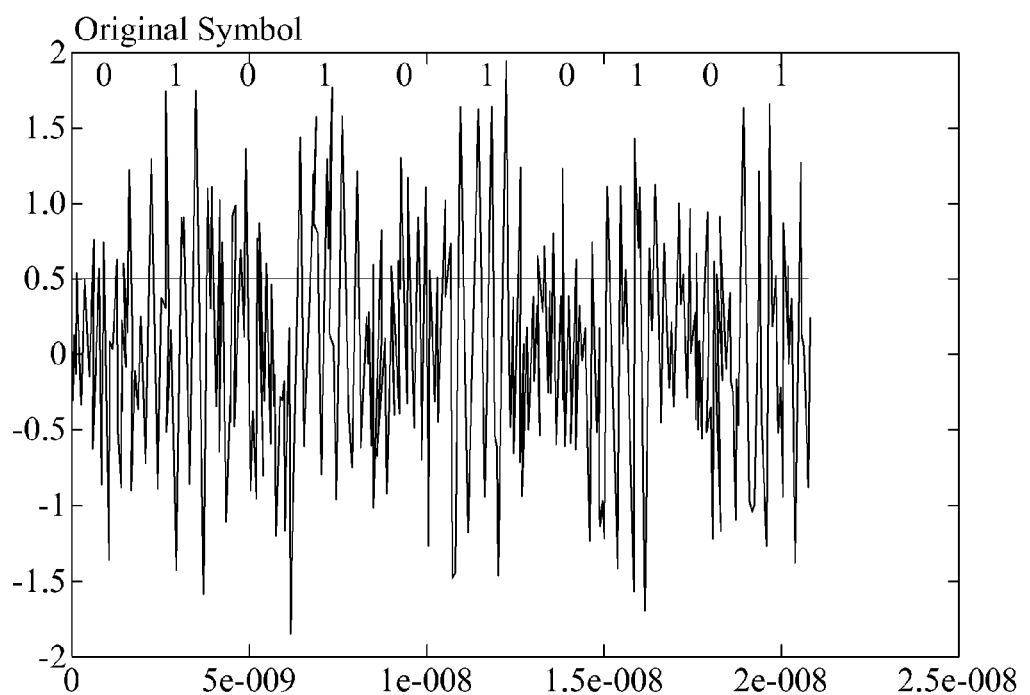

COMMUNICATION SYSTEM FOR RECOGNIZING TYPE OF NOISE SOURCE

CROSS-REFERENCE TO RELATED APPLICATION(S)

This application claims the benefit under 35 U.S.C. §119(a) of Korean Patent Application No. 10-2010-0111386, filed on Nov. 10, 2010, in the Korean Intellectual Property Office, the entire disclosure of which is incorporated herein by reference.

BACKGROUND

1. Field

The following description relates to a communication system that includes recognizing a noise source.

2. Description of Related Art

In a wireless communication system, a signal generated at a transmitter is transmitted to a receiver through a wireless channel. During transmission, the transmitted signal may be deformed and distorted by various noise sources in the wireless channel, which may result in a reception error at the receiving end. Therefore, determining characteristics of the noise source may reduce reception errors.

Noise sources causing reception errors in the wireless communication system may be characterized as additive white Gaussian noise (AWGN) and interference. AWGN refers to a noise signal having almost uniform frequency components in a wide frequency range; AWGN generally exists in nature. Interference refers to a signal (for example, a signal transmitted by another communication system) which distorts received signals of the target wireless communication system. Also, interference may include a signal generated by the target wireless communication system, which disturbs a normal reception signal of another communication system.

In a frequency band where various communication systems coexist, such as an industrial science medical (ISM) frequency band, noise sources may have a significant effect on the communication systems. In particular, a 2.4 GHz band is subject to various communication protocols such as wireless local area network (WLAN), Bluetooth, ZigBee, and the like. Therefore, a mechanism for recognizing and compensating for a noise source is an important feature for a communication system operating in the 2.4 GHz band.

SUMMARY

In one general aspect, a receiving apparatus includes a reception unit to receive, from a transmitting apparatus, information regarding a distribution of at least one logic value of a transmission signal corresponding to an on-off keying (OKK) scheme or a frequency shift keying (FSK) scheme, a set unit to set a detection threshold according to the information regarding the distribution of the at least one logic value of the transmission signal, a detection unit to detect a distribution of the at least one logic value among logic values of a reception signal, and a determination unit to determine a type of a noise source influencing the reception signal, according to the detection threshold and the distribution of the at least one logic value of the reception signal.

The reception unit may recognize the distribution of the at least one logic value of the transmission signal by referring to a table storing candidate values regarding the distribution of the at least one logic value.

The detection unit may detect a number of at least one of a logic value '0' and a logic value '1', from among the logic values of the reception signal.

The determination unit may determine whether the noise source influencing the reception signal is additive white Gaussian noise (AWGN) or an interference signal according to the detection threshold and the distribution of at least one logic value of the reception signal.

The determination unit may determine the noise source as an interference signal when the distribution of the at least one logic value of the reception signal is greater than the detection threshold, and the determination unit determines the noise source as AWGN when the distribution of at least one logic value is equal to or less than the detection threshold.

The receiving apparatus may adjust a power value of the reception value prior to the detection unit detecting the distribution of the at least one logic value among the logic values of the reception signal.

The detection unit may detect a logic value '0' and a logic value '1' based on a predetermined power value or frequency value.

In another general aspect, a transmitting apparatus includes a distribution control unit to control a distribution of at least one logic value among logic values of a transmission signal corresponding to an OOK scheme or an FSK scheme, and a transmission unit to transmit, to a receiving apparatus that receives the transmission signal, information regarding the distribution of the at least one logic value among the logic values of the transmission signal.

The transmission unit may transmit the information regarding the distribution of the at least one logic value among the logic values of the transmission signal by referring to a table storing candidate values regarding the distribution of the at least one logic value.

The transmitting apparatus may further include an acquisition unit to acquire information with respect to a type of a noise source from the receiving apparatus, and a parameter adjustment unit to adjust at least one communication parameter applied to the transmission signal based on the type of the noise source.

In still another general aspect, a receiving apparatus includes a reception unit to receive, from a transmitting apparatus, a training sequence corresponding to an OOK scheme or an FSK scheme, a recognition unit to recognize characteristics of a receive channel based on the training sequence, a calculation unit to calculate at least one error probability with respect to a distribution of at least one logic value included in the training sequence, and a determination unit to determine a type of a noise source influencing the training sequence, according to the characteristics of the receive channel and the error probability.

The determination unit may determine whether the noise source influencing the training sequence is AWGN or an interference signal according to the characteristics of the receive channel and the at least one error probability.

The calculation unit may calculate a first error probability and a second error probability, and the determination unit may determine the noise source as an interference signal when the first error probability is greater than the second error probability and otherwise determines the noise source as AWGN, wherein the first error probability indicates that the logic value '0' is received when the logic value '1' is transmitted, and the second error probability indicates that the logic value '1' is received when the logic value '0' is transmitted.

In a further general aspect, a transmitting apparatus includes a distribution control unit to control a distribution of at least one logic value of a training sequence corresponding to an OOK scheme or an FSK scheme, and a transmission unit to transmit information regarding the distribution of the at least one logic value to a receiving apparatus that receives the training sequence.

The transmitting apparatus may further include an acquisition unit to acquire information with respect to a type of a noise source regarding the training sequence from the receiving apparatus, a parameter adjustment unit to adjust at least one communication parameter applied to the transmission signal based on the type of the noise source.

The parameter adjustment unit may adjust the at least one communication parameter so that the transmission unit transmits in a frequency range that does not include the interference signal.

The parameter adjustment unit may adjust the at least one communication parameter to retransmit the transmission signal if the type of the noise source is an interference signal, and the parameter adjustment unit may adjust the at least one communication parameter to control the data rate of the transmission signal if the type of the noise source is additive white Gaussian noise (AWGN).

In a still further general aspect, a communication system includes a transmitting apparatus to control a distribution of at least one logic value among logic values of a transmission signal corresponding to an OOK scheme or an FSK scheme, and a receiving apparatus to set a detection threshold according to the distribution of the at least one logic value of the transmission signal, and to determine a type of noise source influencing a reception signal, according to the detection threshold and the distribution of the at least one logic value of the reception signal.

The transmitting apparatus may transmit information regarding the distribution of the at least one logic value, and the receiving apparatus sets the detection threshold according to the information regarding the distribution of the at least one logic value.

Other features and aspects will be apparent from the following detailed description, the drawings, and the claims.

As one example, communication performance may be improved by recognizing a type of noise source generated in a communication system corresponding to an on-off keying (OKK) scheme or a frequency shift keying (FSK) scheme and compensating for the noise, based on the type of noise source.

In addition, as another example, an interference signal may be detected by a receiving apparatus, as opposed to a transmitting apparatus, and adjustment for the interference signal may be performed by the transmitting apparatus. Therefore, errors due to a false interference alarm or hidden node problem may be mitigated.

BRIEF DESCRIPTION OF THE DRAWINGS

FIG. 2 is a diagram illustrating an example of a waveform of a reception signal in a general on-off keying (OOK) system.

Figure 1:
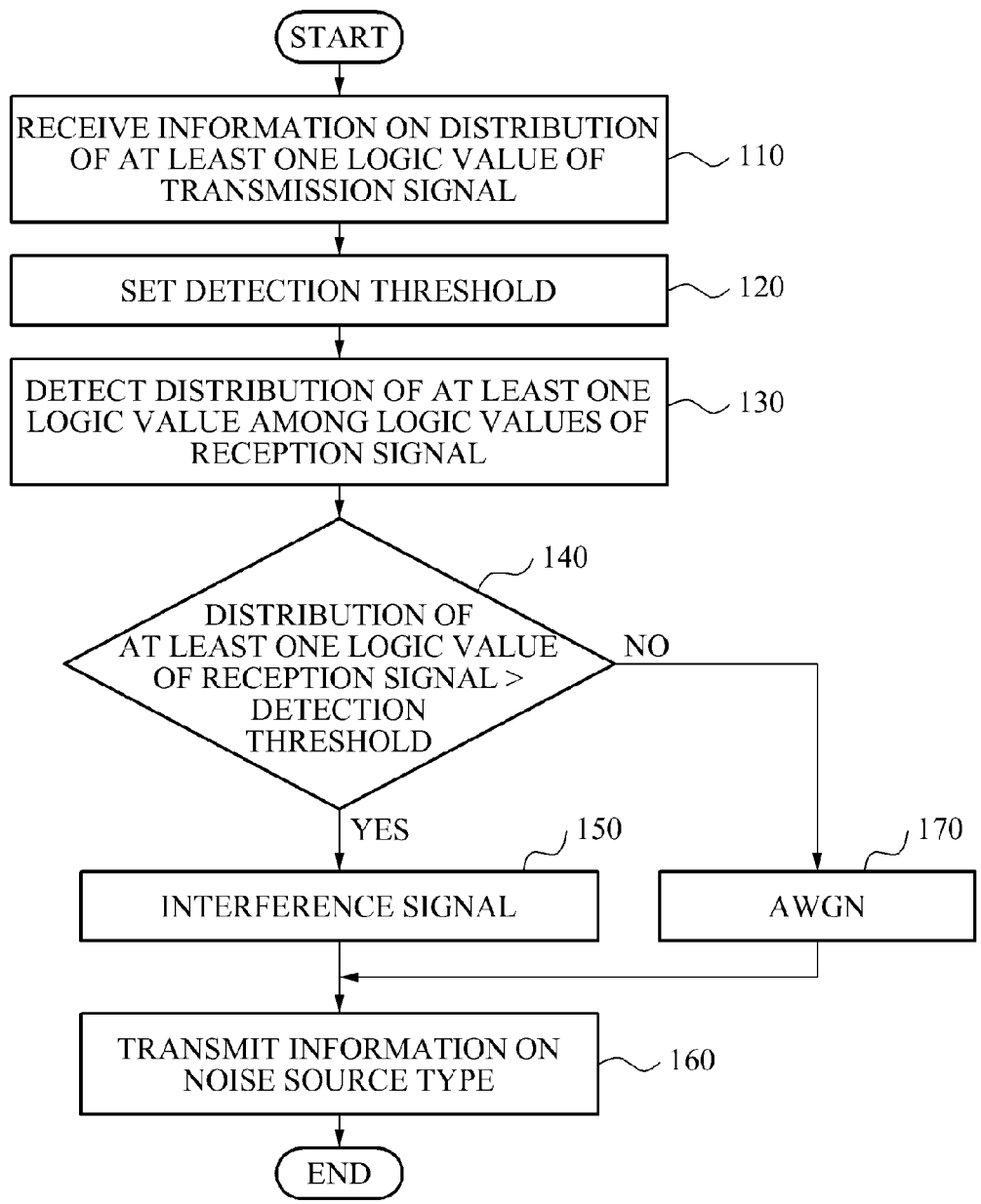
FIG. 1 is a flowchart illustrating an example of a receiving method of a receiving apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

An on-off keying (OOK) scheme refers to a digital modulation scheme that transmits and receives information using a symbol '1' represented by the existence of a signal and a symbol '0' represented by the absence of a signal. Compared to other digital modulation schemes, the OOK scheme has relatively low bit transmission rate. However, the OOK scheme may reduce power consumption at a transmission end, compared to other digital modulation schemes, by using an off state to represent the symbol '0'. More particularly, the OOK scheme may comparatively increase power efficiency of a transmitting apparatus by turning off an oscillator or an output power amplifier during a time period when the transmission end is not transmitting.

A receiving apparatus applying the OOK scheme may include relatively simple components compared to an implementation for high-order linear modulation schemes, and therefore may comparatively reduce reception power consumption.

As an example, the receiving apparatus applying the OOK scheme may be implemented by the following method. Amplitude information regarding a signal in a desired frequency band is extracted by an envelope detector. A signal '1' is detected when the extracted value is equal to or greater than a detection threshold. A signal '0' is detected when the extracted value is less than the detection threshold. Thus, signal detection is achieved without carrier demodulation using an active radio frequency (RF) element. According to the above example, power consumption of the receiving apparatus may be reduced compared to other digital modulation schemes.

According to a frequency shift keying (FSK) scheme, information transmission is achieved by allocating relatively different frequencies $f_i$ to respective symbols $x_i$ to be transmitted, transmitting the symbols $x_i$, and receiving signals allocated for each frequency by a receiving end.

Generally, a receiving apparatus applying the FSK scheme includes a set of receivers using the OOK scheme and parallel-connected for the respective frequencies $f_i$. The receiving apparatus also generally includes a detector to detect a symbol $x_i$ having a greatest value of output amplitude of the receivers.

A binary FSK receiving apparatus may include a single receiving apparatus applying the OOK scheme, in order to reduce power consumption. That is, signal detection may be performed by detecting only one frequency signal from two frequency signals according to the detection threshold of the output amplitude.

The communication system using the OOK scheme and the FSK scheme may be affected by an interference signal due to the signal off state. That is, if external noise signals, such as the interference signal, occur during a time period where signal transmission is not performed, performance of the communication system may be significantly reduced.

Therefore, the communication system using the OOK scheme and the FSK scheme may improve its performance by recognizing and compensating for the interference signal.

In general, the interference signal may be recognized and compensated for by interference avoidance of a transmission end. More particularly, to reduce the effect of the interference signal, signal transmission may be performed after confirming absence of the interference signal by checking a channel state before the transmission end transmits a signal. For example, a carrier sensing multiple access (CSMA) scheme may be used.

Even though the transmission end transmits the signal when absence of the interference is confirmed, signal collision by the interference signal may still occur due to various factors.

A collision avoidance method, a collision detection method, and the like, may be employed to reduce the effect of signal collision. The collision avoidance method transmits a signal notifying that a particular channel is to be used. The collision detection method detects whether any interference signal exists during the signal transmission.

According to the collision avoidance and the collision detection methods, however, the transmission end predicts an opportunity for communication and determines whether communication is to be performed. However, the transmission end may react sensitively to interference signals, such that an opportunity for communication may be lost even when communication is actually possible. In addition, communication problems may arise when the transmission end fails to detect an ambient interference signal due to a hidden node.

According to one example, a communication system using the OOK scheme and the FSK scheme is capable of recognizing characteristics of a received signal and detecting and compensating for an interference signal using the characteristics.

FIG. 1 illustrates an example of a receiving method of a receiving apparatus.

Referring to FIG. 1, in operation 110, the receiving apparatus receives, from a transmitting apparatus, information on distribution of at least one logic value of a transmission signal corresponding to an OOK scheme or an FSK scheme.

Here, the receiving apparatus may recognize the distribution of at least one logic value of the transmission signal, according to a predetermined table or information on the distribution of at least one logic value included in a frame. Candidate values related to the distribution of at least one logic value may be stored in the predetermined table.

In operation 120, the receiving apparatus may set a detection threshold according to the information on the distribution of at least one logic value of the transmission signal. Also, in operation 130, the receiving apparatus may detect a distribution of at least one logic value among logic values of a reception signal.

In operation 130, the receiving apparatus may detect the number of at least one of a logic value '0' and a logic value '1' among logic values of the reception signal, thereby recognizing distribution of the logic values. For example, the receiving apparatus may determine whether distribution of the logic value '0' and the logic value '1' is a balanced distribution or an out of balance distribution.

The receiving apparatus may determine whether a type of noise source influencing the reception signal is additive white Gaussian noise (AWGN) or an interference signal, based upon the detection threshold and the distribution of at least one logic value among the logic values of the reception signal.

In a communication system using the OOK scheme, error characteristics of the AWGN and of the interference signal are generally different. Therefore, the type of noise source may be determined using the different characteristics.

Figure 3A:
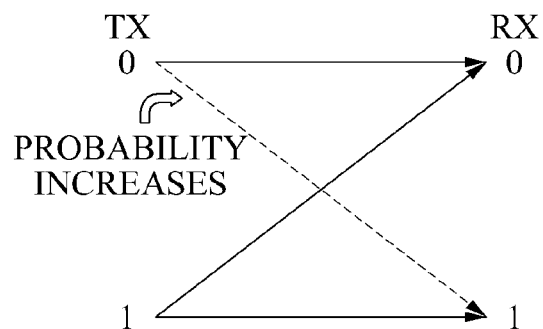
FIGS. 3A and 3B are diagrams illustrating an example of reception probability varied by an interference signal and additive white Gaussian noise (AWGN).
Figure 3B:
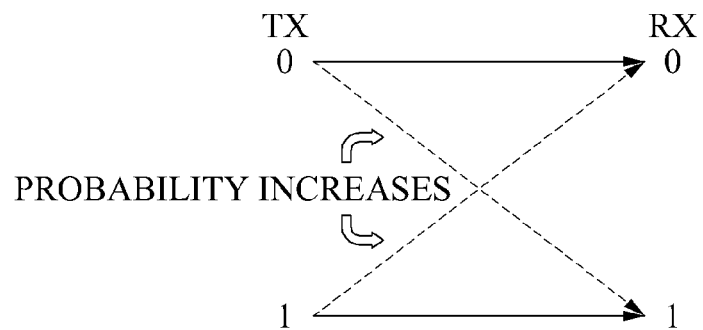

With reference to FIGS. 2, 3A, and 3B, waveform characteristics of the reception signal, the error characteristics, and methods of determining the type of noise source using those characteristics is further described.

The receiving apparatus determines whether distribution of at least one logic value of the reception signal exceeds the detection threshold in operation 140.

If the distribution of at least one logic value exceeds the detection threshold, the receiving apparatus may determine that the noise source is an interference signal in operation 150, and transmit information on the type of noise source to the transmitting apparatus in operation 160. For example, the information may indicate that the noise source of the corresponding reception signal is the interference signal.

If the distribution of at least one logic value of the reception signal determined to be equal to or less than the detection threshold in operation 140, the receiving apparatus may determine the noise source is the AWGN in operation 170, and transmit information indicating the noise source is the AWGN to the transmitting apparatus in operation 160.

FIG. 2 illustrates an example of a waveform of a reception signal in a general OOK system.

The upper graph of FIG. 2 illustrates distortion of the reception signal due to an interference signal. The lower graph of FIG. 2 illustrates distortion of the reception signal due to AWGN.

As described above, in the OOK scheme, a symbol '1' indicates a state where a signal exists, and a symbol '0' indicates a state where a signal is absent. According to the OOK scheme, error characteristics are generally different between when a signal error is caused by an interference signal and when the signal error is caused by AWGN.

When an interference signal causes the signal error, as illustrated in the upper graph of FIG. 2, an error rate is relatively high in a section where the symbol '0' is transmitted, because a signal does not exist.

However, as illustrated in the lower graph of FIG. 2, when AWGN causes the signal error, the error occurs in both a section represented by the symbol '1' as well as in a section represented by the symbol '0.'

That is, an interference signal may cause a higher imbalance of error distribution than AWGN, as can be appreciated from FIG. 3.

FIGS. 3A and 3B illustrate an example of reception probability varied by an interference signal and AWGN. FIG. 3A shows variation of the reception probability caused by an interference signal. FIG. 3B shows variation of the reception probability caused by AWGN.

When an error is generated by an interference signal as illustrated in FIG. 3A, only probability P(Sending='0'|Receiving='1') greatly increases, that is, the probability of a transmitting apparatus transmitting a '0' and the receiving apparatus receiving a '1'. Conversely, when an error is generated by AWGN, both probability P(Sending='1'|Receiving='0') and the probability P(Sending='0'|Receiving='1') increase.

To summarize, a reception signal received by the receiving apparatus may be expressed by Equation 1 as follows:

$$r_i(t)=X_i\cos(2\pi f_c t)+I_0\cos(2\pi f_c t+\phi_0)+n(t) \quad \text{[Equation 1]}$$

wherein $X_i \in \{0,1\}$, $\phi_i \in [0,2\pi]$, $f_c$ denotes a transmission frequency, and t denotes time. Also, $I_0$ denotes an amplitude of an interference signal, and n(t) denotes AWGN.

In Equation 1, $r_i(t)$ denotes the reception signal received by the receiving apparatus, $X_i \cos(2\pi f_c t)$ denotes a transmission signal transmitted by the transmitting apparatus, and $I_0 \cos(2\pi f_c t+\phi_0)$ denotes the interference signal.

AWGN influencing the reception signal may be expressed by Equation 2 as follows:

$$n(t)=n_I(t)\cos(2\pi f_c t)+n_Q(t)\sin(2\pi f_c t) \quad \text{[Equation 2]}$$

wherein $n_I$ denotes an in-phase constituent of noise, and $n_Q$ denotes a quadrature constituent of noise. Therefore, presuming that a quadrature non-coherent receiver receives the above reception signal and that the reception signal is influenced by a noise source, the amplitude of the reception signal may be calculated in the following manner.

1) If the noise source is the AWGN,
a) when the transmitting apparatus transmits the symbol '0':

$$r_i=\sqrt{n_I^2+n_Q^2};$$

b) when the transmitting apparatus transmits the symbol '1':

$$r_i=\sqrt{(X_i+n_I)^2+n_Q^2}.$$

2) If the noise source is the interference signal,
a) when the transmitting apparatus transmits the symbol '0':

$$r_i=\sqrt{(B\cos\phi_i+n_I)^2+(B\sin\phi_i+n_Q)^2};$$

b) when the transmitting apparatus transmits the symbol '1':

$$r_i=\sqrt{(X_i+B\cos\phi_i+n_I)^2+(B\sin\phi_i+n_Q)^2}.$$

When the noise source is the interference signal and when the transmitting apparatus transmits the symbol '0', the receiving apparatus may have a Rice probability distribution due to an interference component B. Accordingly, the error probability greatly increases in comparison to when the noise source is AWGN.

Thus, occurrence of the error by AWGN or an interference signal may be detected according to whether the number of the symbol '1' of the reception signal exceeds the detection threshold. In addition, according to the example embodiment, the transmitting apparatus may adaptively adjust at least one communication parameter applied to the transmission signal to compensate for the respective noise sources, thereby improving the communication efficiency. This is further described herein with reference to FIG. 4.

Figure 4:
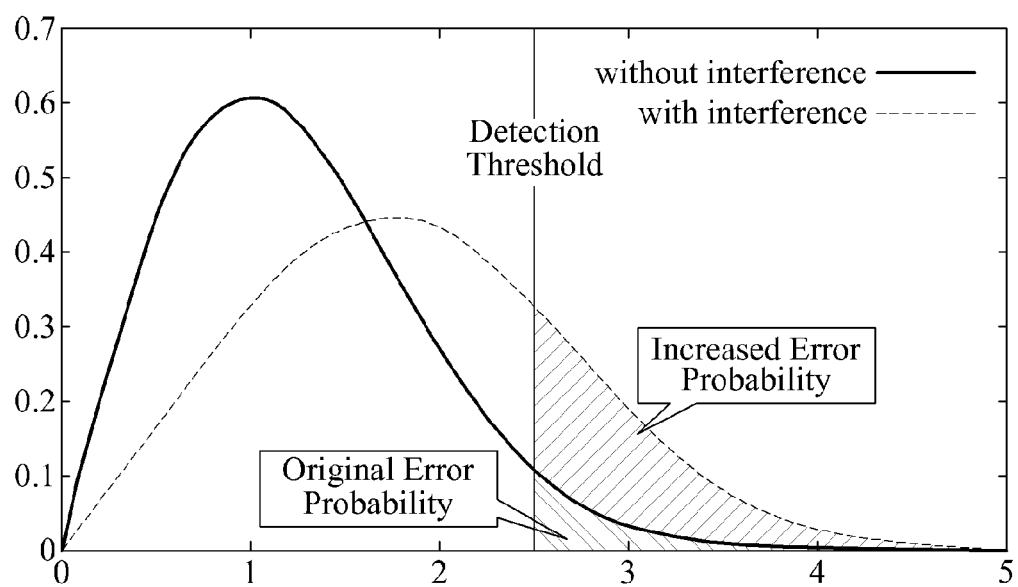
FIG. 4 is a diagram illustrating an example of probability distribution of intensity of a reception signal according to a presence of an interference signal when a symbol '0' is transmitted.

FIG. 4 illustrates an example of probability distribution of reception signal intensity according to a presence of an interference signal when a symbol '0' is transmitted.

Referring to FIG. 4, when a detection threshold is 2.5, an original signal is determined as the symbol '0' in the position corresponding to the detection threshold. However, when the original signal is deformed by an interference signal, the probability distribution of the reception signal intensity may shift to the right, as illustrated in FIG. 4. Accordingly, a probability that a signal in the position corresponding to the detection threshold is determined as the symbol '1' is increased.

Figure 5:
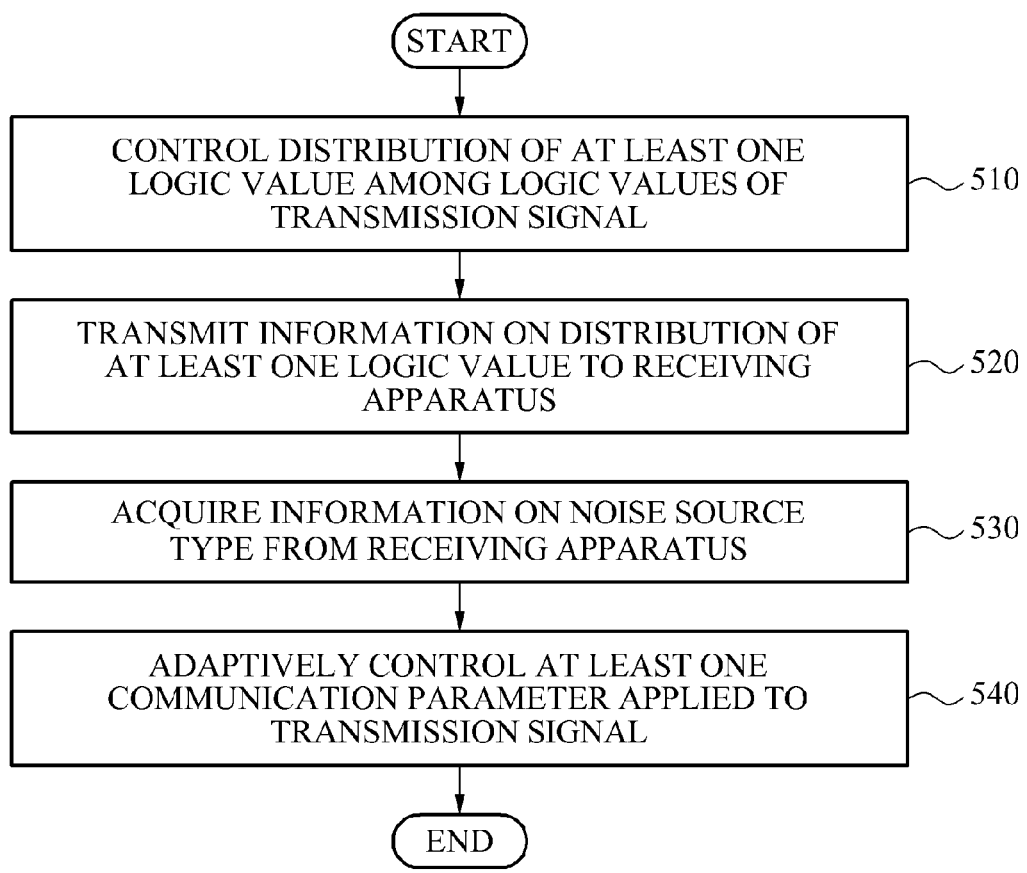
FIG. 5 is a flowchart illustrating an example of a transmitting method of a transmitting apparatus.

FIG. 5 is a flowchart illustrating an example of a transmitting method of a transmitting apparatus.

Referring to FIG. 5, in operation 510, the transmitting apparatus controls a distribution of at least one logic value among logic values of a transmission signal corresponding to the OOK scheme or the FSK scheme.

For example, the transmitting apparatus may control a distribution of logic values '0' and '1' among the logic values of the transmission signal, to have a balanced distribution or to have a random distribution.

In operation 520, the transmitting apparatus transmits information on the distribution of at least one logic value among the logic values of the transmission signal to a receiving apparatus that receives the transmission signal.

Here, the transmitting apparatus may transmit the information using a predetermined table. Candidate values related to the distribution of at least one logic value may be stored in the predetermined table.

The receiving apparatus that receives the information on the distribution of at least one logic value from the transmitting apparatus may determine a type of a noise source influencing the reception signal according to corresponding information, and may transmit information on the type of noise source to the transmitting apparatus.

The transmitting apparatus acquires the information on the type of noise source from the receiving apparatus in operation 530, and adaptively adjusts at least one communication parameter applied to the transmission signal in operation 540. The at least one communication parameter may be adaptively adjusted depending on the type of noise source.

In operation 540, the transmitting apparatus may adjust the at least one communication parameter, for example, by an adaptive frequency hopping method. According to the adaptive frequency hopping method, the transmitting apparatus may avoid transmitting in a frequency range containing an interference signal. As another example, the transmitting apparatus may adaptively adjust a communication parameter for the frequency range containing the interference signal.

In addition, the at least one communication parameter may be adjusted according to other methods. When the noise source is an interference signal, the transmitting apparatus may retransmit a signal in a predetermined time period. When the noise source is AWGN, the transmitting apparatus may control data rate of the system.

Figure 6:
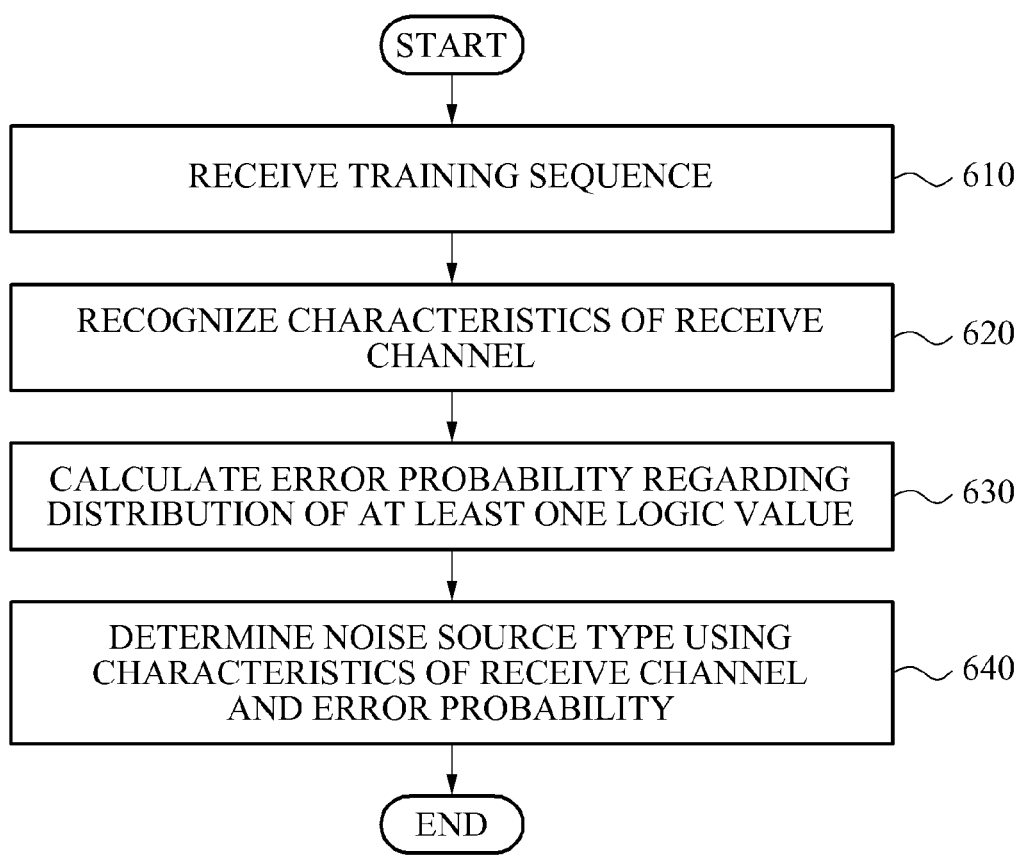
FIG. 6 is a flowchart illustrating another example of a receiving method of a receiving apparatus.

FIG. 6 is a flowchart illustrating another example of a receiving method of a receiving apparatus.

Referring to FIG. 6, in operation 610, the receiving apparatus receives a training sequence corresponding to the OOK scheme or the FSK scheme from a transmitting apparatus.

The training sequence may randomly include a logic value '0' and a logic value '1.'

In operation 620, the receiving apparatus recognizes characteristics of a receive channel, based on the training sequence. The receiving apparatus calculates error probability with respect to distribution of at least one logic value included in the training sequence in operation 630.

As an example, when the training sequence is "001101," the transmitting apparatus and the receiving apparatus are informed, in advance, that the training sequence is "001101."

Therefore, when the transmitting apparatus transmits the training sequence "001101" through the receive channel, the receiving apparatus receiving the training sequence may recognize characteristics, such as path fading, of the receive channel from the training sequence.

In addition, when the training sequence "001101" transmitted by the transmitting apparatus is received as, for example, "111100" by the receiving apparatus, the receiving apparatus may calculate the error probability regarding the distribution of at least one logic value included in the training sequence.

Here, the error probability regarding the distribution of at least one logic value may refer to a probability of a certain error with respect to all errors occurring in relation to the distribution of at least one logic value.

As a particular example, when the training sequence "001101" transmitted by the transmitting apparatus is received as "111100", the receiving apparatus may calculate the error probability with respect to 3 bits out of a total of 6 bits. That is, probability of the error that shows the logic value '0' in place of the logic value '1' may be calculated as $\frac{2}{3}$=66%, and probability of the error that shows the logic value '1' in place of the logic value '0' may be calculated as $\frac{1}{3}$=33%.

As another example, the receiving apparatus may recognize the characteristics of the receive channel with respect to default value besides the training sequence, and calculate the probability of the corresponding error with respect to all errors occurring in relation to the distribution of at least one logic value.

In operation 640, the receiving apparatus determines the type of noise source influencing the training sequence by using the characteristics of the receive channel and the error probability.

As a further example, the receiving apparatus may determine whether the noise source influencing the training sequence is AWGN or an interference signal, using the characteristics of the receive channel or using the error probability, that is, the probability of the corresponding error with respect to all errors occurring in relation to the distribution of at least one logic value.

More particularly, with respect to the error probability according to the characteristics of the receive channel, when probability of the error that shows the logic value '0' in place of the logic value '1' is greater than probability of the error that shows the logic value '1' in place of the logic value '0' in operation 640, the receiving apparatus may determine that the noise source is an interference signal. In other examples, the noise source may be determined as AWGN.

For example, the error probability showing the logic value '0' as the logic value '1' is $\frac{2}{3}$=66%, and the error probability showing the logic value '1' as the logic value '0' is $\frac{1}{3}$=33%, with respect to the total error probability regarding a training sequence "001101."

In this example, out of the error probability according to the characteristics of the receive channel, that is, the probability of the corresponding error with respect to all errors occurring in relation to the distribution of at least one logic value, the error probability of showing the logic value '0' in place of the logic value '1' is greater than the error probability of showing the logic value '1' in place of the logic value '0.'

Accordingly, the receiving apparatus may determine the noise source as an interference signal.

As a further example related to operation 640, the receiving apparatus may consider the characteristics of the receive channel in calculating the error probability. For example, when the path fading of the receive channel is high, the error probability may be separately calculated for every path experiencing path fading, such that the noise source is determined according to the characteristics of the receive channel, including the path fading, even with the same error probability.

Figure 10:
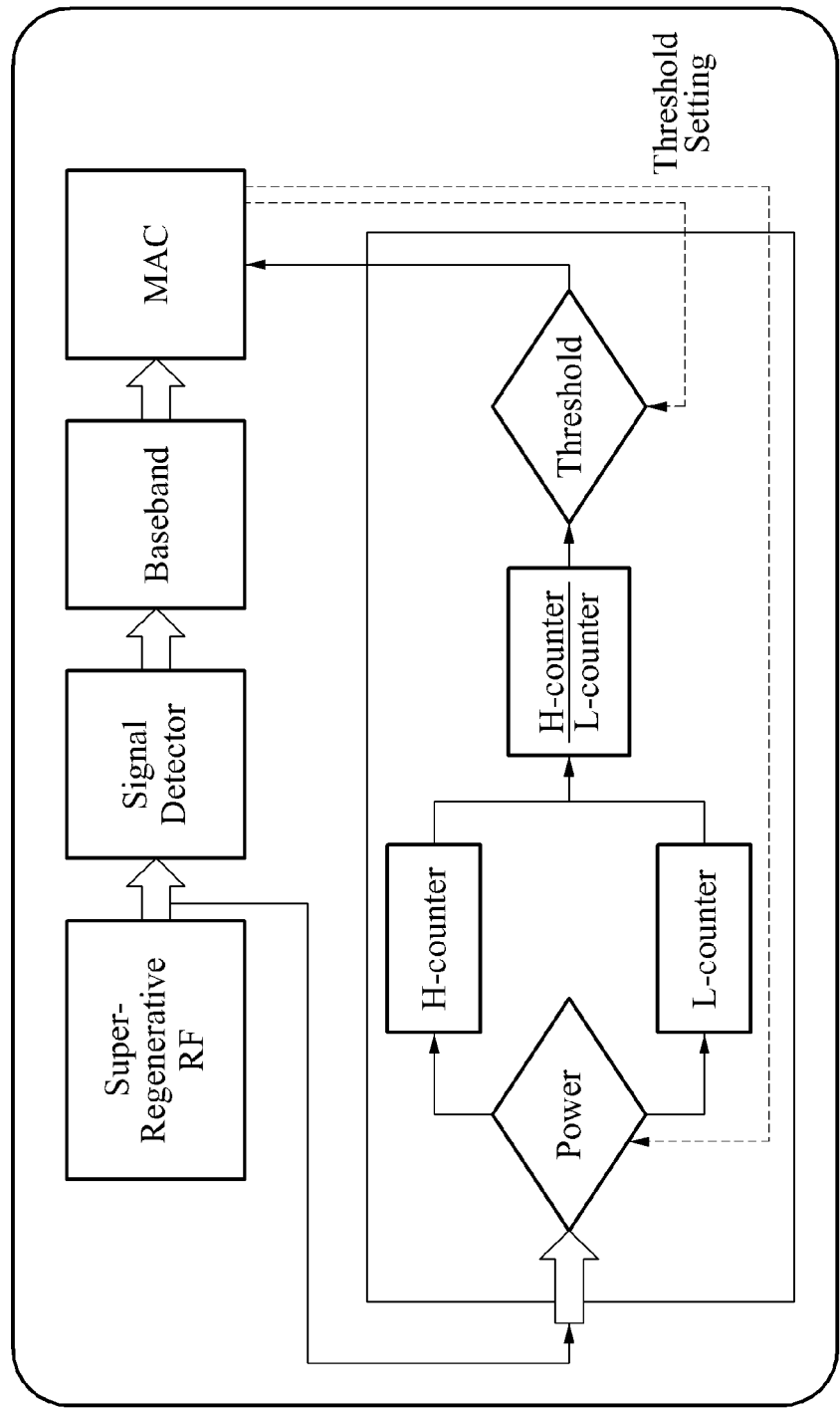
FIG. 10 is a diagram illustrating an example of a receiving apparatus determining a logic value based on a soft-decision method.
Figure 11:
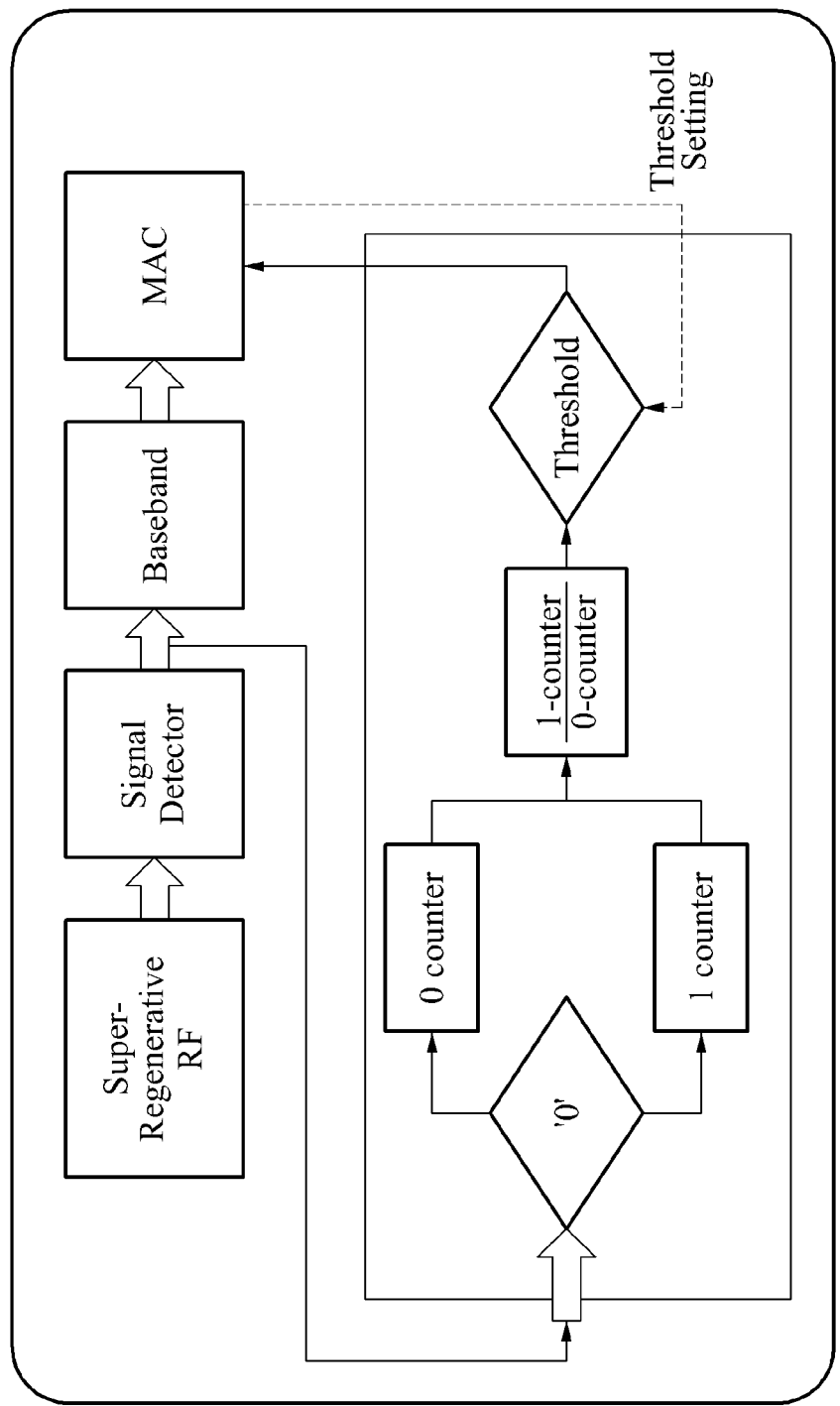
FIG. 11 is a diagram illustrating an example of a receiving apparatus determining a logic value based on a hard-decision method.

In addition, the receiving apparatus may determine the logic value '0' or '1' of the reception signal or the training sequence based on a soft-decision method or a hard-decision method, which are described herein with reference to FIGS. 10 and 11.

Figure 7:
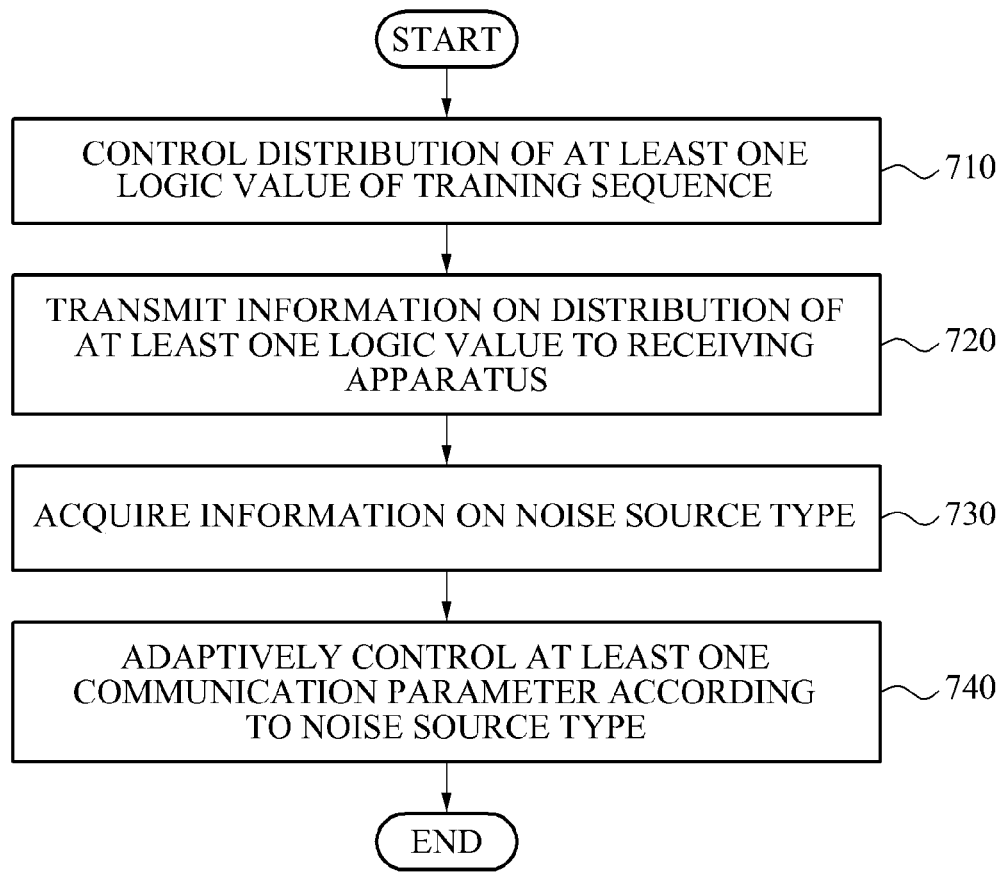
FIG. 7 is a flowchart illustrating another example of a transmitting method of a transmitting apparatus.

FIG. 7 is a flowchart illustrating another example of a transmitting method of a transmitting apparatus.

Referring to FIG. 7, in operation 710, the transmitting apparatus controls distribution of at least one logic value of a training sequence, which may correspond to the OOK scheme or the FSK scheme.

The transmitting apparatus may control distribution of logic values '0' and '1' of the training sequence to have a balanced distribution or to have a random distribution.

In operation 720, the transmitting apparatus transmits information on the distribution of at least one logic value to a receiving apparatus that receives the training sequence.

In operation 730, the transmitting apparatus acquires information on a type of noise source influencing the training sequence from the receiving apparatus. In operation 740, at least one communication parameter applied to the training sequence is adaptively adjusted according to the type of noise source. An example of a method of adaptively adjusting the at least one communication parameter is described above with respect to operation 540 of FIG. 5.

Figure 8:
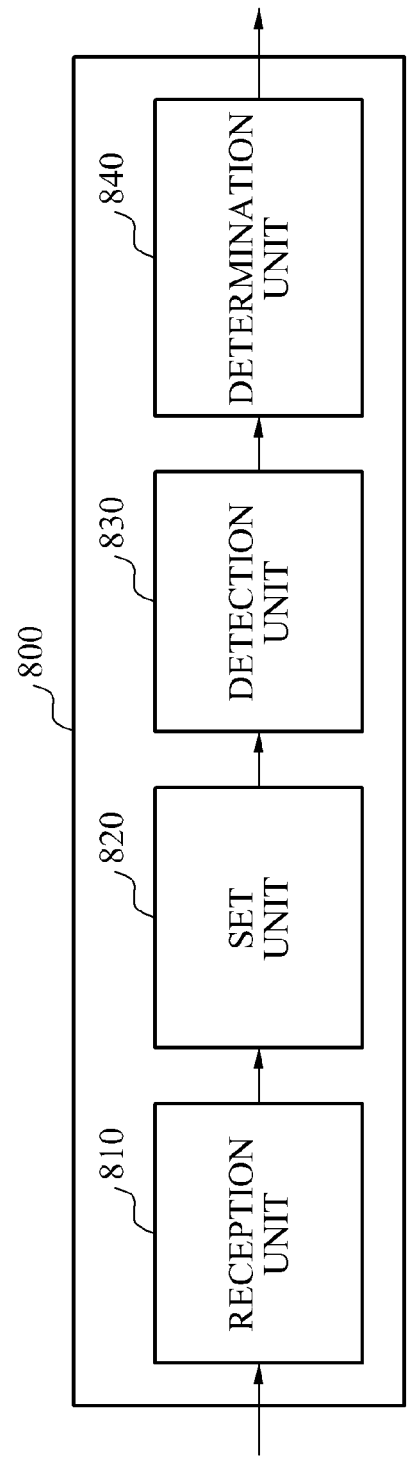
FIG. 8 is a block diagram illustrating an example of a receiving apparatus.

FIG. 8 is a block diagram illustrating an example of a receiving apparatus 800.

Referring to FIG. 8, the receiving apparatus 800 may include a reception unit 810, a set unit 820, a detection unit 830, and a determination unit 840.

The reception unit 810 may be adapted to receive, from a transmitting apparatus, information on distribution of at least one logic value of a transmission signal corresponding to the OOK scheme or the FSK scheme.

In addition, the reception unit 810 may recognize the distribution of at least one logic value of the transmission signal, according to a table storing candidate values related to the distribution of at least one logic value.

The set unit 820 may set a detection threshold according to information on the distribution of at least one logic value of the transmission signal.

The detection unit 830 may detect a distribution of at least one logic value of logic values of a reception signal.

The detection unit 830 may detect the number of any one or both of a logic value '0' and a logic value '1' among the logic values of the reception signal. The determination unit 840 may determine a type of noise source influencing the reception signal, according to the detection threshold and the distribution of at least one logic value of the reception signal.

For example, when the distribution of at least one logic value of the reception signal is greater than the detection threshold, the determination unit 840 may determine the noise source as an interference signal. Accordingly, when the distribution is equal to or less than the detection threshold, the determination unit 840 may determine the noise source as AWGN.

Figure 9:
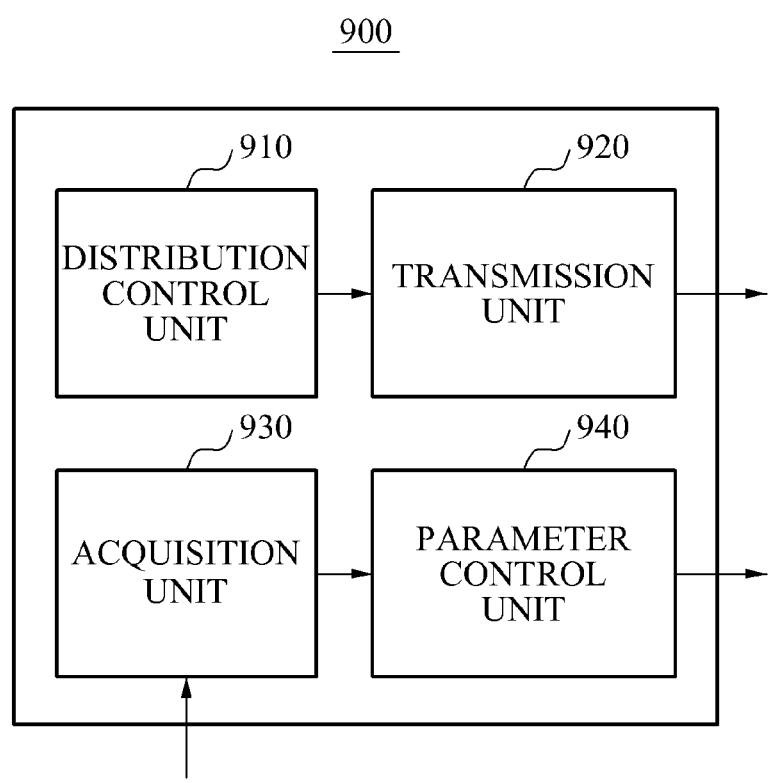
FIG. 9 is a block diagram illustrating an example of a transmitting apparatus.

FIG. 9 is a block diagram illustrating an example of a transmitting apparatus 900.

Referring to FIG. 9, the transmitting apparatus 900 may include a distribution control unit 910, a transmission unit 920, an acquisition unit 930, and a parameter adjustment unit 940.

The distribution control unit 910 may control distribution of at least one logic value among logic values of a transmission signal corresponding to the OOK scheme or the FSK scheme.

The transmission unit 920 may transmit information regarding the distribution of at least one logic value among the logic values of the transmission signal to a receiving apparatus that receives the transmission signal.

In addition, the transmission unit 920 may transmit information on a distribution of at least one logic value among logic values of the transmission signal, using a table storing candidate values related to the distribution of at least one logic value.

The acquisition unit 930 may acquire, from the receiving apparatus, information on a type of noise.

The parameter adjustment unit 940 may adaptively adjust at least one communication parameter applied to the transmission signal, based on the type of noise source.

FIG. 10 is a diagram illustrating an example of a receiving apparatus determining a logic value based on a soft-decision method. FIG. 11 is a diagram illustrating an example of a receiving apparatus determining a logic value based on a hard-decision method.

Referring to FIG. 10, the receiving apparatus may adjust a power value of a signal received from the transmitting apparatus used in determining whether a logic value of the signal is determined to be 'high' or 'low.' Unlike the hard-decision method, the soft-decision method may adjust the power value for determining the reception signal.

For example, when the reception signal determined to have the logic value 'high' has a power value of about 5 V and when the reception signal determined to have the logic value 'low' has a power value of about 0 V, the soft-decision method may adjust a reference power of the reception signal having the 'low' logic value to about 3 V or 2.5 V, rather than 5 V. Therefore, the receiving apparatus applying the soft-decision method may compare a detection threshold to a distribution of the logic value determined based on the adjusted reference power.

Referring to FIG. 11, the receiving apparatus may determine whether a logic value of the reception signal is '0' or '1' based on a predetermined power value or frequency value. Therefore, the receiving apparatus applying the hard-decision method may compare a detection threshold to the distribution of the logic value '0' or '1.'

Thus, the receiving apparatuses according to the examples herein may determine the logic value based on the soft-decision method or the hard-decision method.

Figure 12:
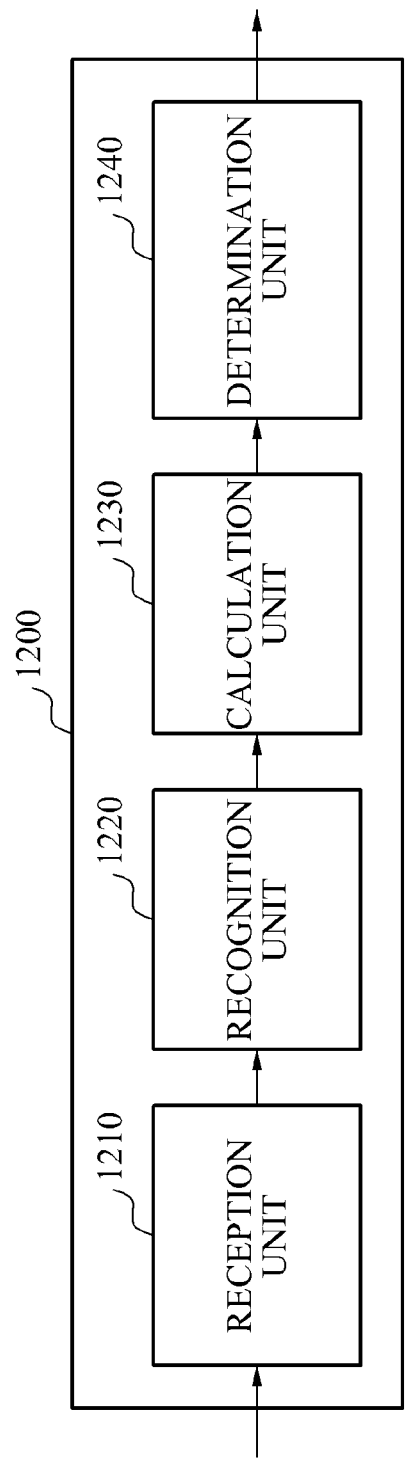
FIG. 12 is a block diagram illustrating another example of a receiving apparatus.

FIG. 12 is a block diagram illustrating another example of a receiving apparatus 1200.

Referring to FIG. 12, the receiving apparatus 1200 may include a reception unit 1210, a recognition unit 1220, a calculation unit 1230, and a determination unit 1240.

The reception unit 1210 may receive, from a transmitting apparatus, a training sequence corresponding to the OOK scheme or the FSK scheme.

The recognition unit 1220 may recognize characteristics of a receive channel based on the training sequence.

The calculation unit 1230 may calculate a probability of an error according to a distribution of at least one logic value included in the training sequence.

The determination unit 1240 may determine, according to the characteristics of the receive channel and the error probability, a type of noise source influencing the training sequence.

Further, the determination unit 1240 may also determine whether the noise source influencing the training sequence is AWGN or an interference signal.

More particularly, the determination unit 1240 may determine the noise source as an interference signal when a probability of an error that shows a logic value '0' in place of a logic value '1' is greater than probability of an error that shows a logic value '1' in place of a logic value '0' out of the error probability, according to the characteristics of the receive channel. Otherwise, the determination unit 120 may determine the noise source is AWGN.

Figure 13:
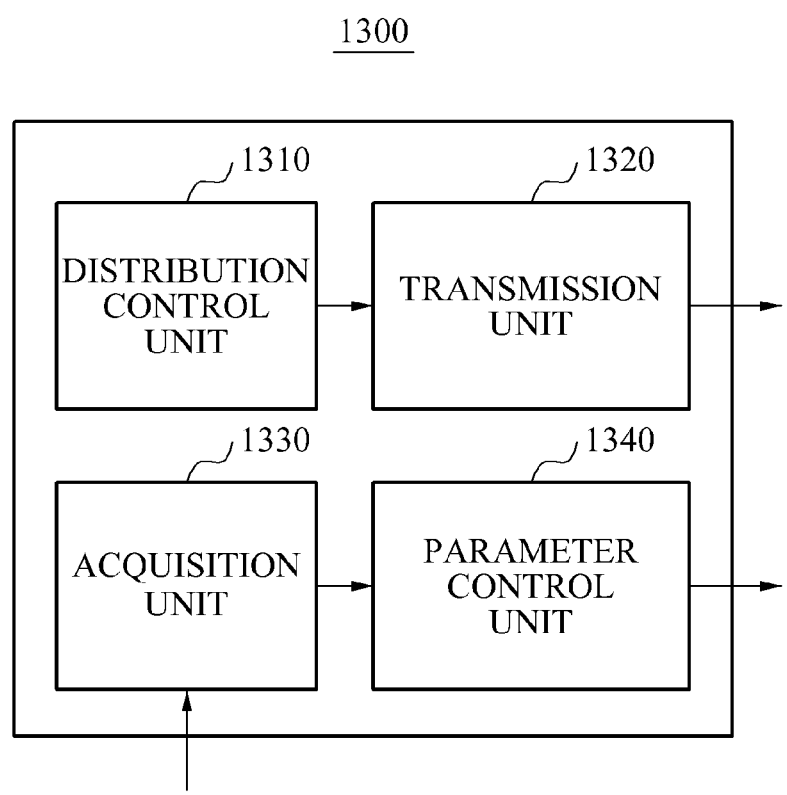
FIG. 13 is a block diagram illustrating another example of a transmitting apparatus.

FIG. 13 is a block diagram illustrating another example of a transmitting apparatus 1300.

Referring to FIG. 13, the transmitting apparatus 1300 may include a distribution control unit 1310, a transmission unit 1320, an acquisition unit 1330, and a parameter adjustment unit 1340.

The distribution control unit 1310 may a control distribution of at least one logic value of a training sequence corresponding to the OOK scheme or the FSK scheme.

The transmission unit 1320 may transmit information regarding the distribution of at least one logic value from a receiving apparatus that receives the training sequence.

The acquisition unit 1330 may acquire, from the receiving apparatus, information on a type of noise source influencing the training sequence.

The parameter adjustment unit 1340 may adaptively adjust at least one communication parameter applied to the training sequence, depending on the type of noise source.

As an example, a communication system may include the above-described transmitting apparatus and receiving apparatus.

A transmitting apparatus of an example communication system may control the distribution of at least one logic value among logic values of a transmission signal corresponding to the OOK scheme or the FSK scheme.

A receiving apparatus of the example communication system may set a detection threshold according to the distribution of at least one logic value of the transmission signal, and may determine a type of noise source influencing a reception signal using the detection threshold and the distribution of at least one logic value.

The other operations of the transmission apparatus and the receiving apparatus of the communication system may be understood from the above description.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on to the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A receiving apparatus comprising:
 a receiver configured to receive, from a transmitting apparatus, information regarding a distribution of a logic value of a transmission signal corresponding to an on-off keying (OOK) scheme or a frequency shift keying (FSK) scheme;
 a setter configured to set a detection threshold according to the information regarding the distribution of the logic value of the transmission signal;
 a detector configured to detect a distribution of the logic value among logic values of a reception signal; and
 a determiner configured to determine a type of a noise source influencing the reception signal, according to the detection threshold and the distribution of the logic value of the reception signal, and to determine whether the noise source influencing the reception signal is additive white Gaussian noise (AWGN) or an interference signal according to the detection threshold and the distribution of a logic value of the reception signal.

2. The receiving apparatus of claim 1, wherein the receiver is configured to recognize the distribution of the logic value of the transmission signal by referring to a table storing candidate values regarding the distribution of the logic value.

3. The receiving apparatus of claim 1, wherein the detector is configured to detect a number of one or both of a logic value '0' and a logic value '1', from among the logic values of the reception signal.

4. The receiving apparatus of claim 1, wherein the determiner is configured to determine the noise source as an interference signal when the distribution of the logic value of the reception signal is greater than the detection threshold, and the determination unit determines the noise source as AWGN when the distribution of the logic value is equal to or less than the detection threshold.

5. A transmitting apparatus comprising:
 a distribution controller configured to control a distribution of a logic value among logic values of a transmission signal corresponding to an on-off keying (OOK) scheme or a frequency shift keying (FSK) scheme;
 a transmitter configured to transmit, to a receiving apparatus that receives the transmission signal, information regarding the distribution of the logic value among the logic values of the transmission signal: and
 a parameter adjuster configured to adjust a communication parameter applied to the transmission signal based on a type of noise source acquired from the receiving apparatus, to adjust the communication parameter to retransmit the transmission signal in response to the type of the noise source being an interference signal, and to adjust the communication parameter to control the data rate of the transmission signal in response to the type of the noise source being additive white Gaussian noise (AWGN).

6. The transmitting apparatus of claim 5, wherein the transmitter is configured to transmit the information regarding the distribution of the logic value among the logic values of the transmission signal by referring to a table storing candidate values regarding the distribution of the logic value.

7. The transmitting apparatus of claim 5, further comprising:
 an acquirer configured to acquire the information with respect to the type of a noise source from the receiving apparatus.

8. A receiving apparatus comprising:
 a receiver configured to receive, from a transmitting apparatus, a training sequence corresponding to an on-off keying (OOK) scheme or a frequency shift keying (FSK) scheme;
 a recognizer configured to recognize characteristics of a receive channel, based on the training sequence;
 a calculator configured to calculate an error probability with respect to a distribution of a logic value included in the training sequence; and
 a determiner configured to determine a type of a noise source influencing the training sequence, according to the characteristics of the receive channel and the error probability and to determine whether the noise source influencing the training sequence is additive white Gaussian noise (AWGN) or an interference signal according to the characteristics of the receive channel and the error probability.

9. The receiving apparatus of claim 8, wherein:
 the calculator is configured to calculate a first error probability and a second error probability; and
 the determiner is configured determines the noise source as an interference signal when the first error probability is greater than the second error probability and otherwise determines the noise source as AWGN,
 wherein the first error probability indicates that the logic value '0' is received when the logic value '1' is transmitted, and the second error probability indicates that the logic value '1' is received when the logic value '0' is transmitted.

10. A transmitting apparatus comprising:
 a distribution controller configured to control a distribution of a logic value of a training sequence corresponding to an on-off keying (OOK) scheme or a frequency shift keying (FSK) scheme; and
 a transmitter configured to transmit information regarding the distribution of the logic value to a receiving apparatus that receives the training sequence; and
 a parameter adjuster configured to adjust a communication parameter applied to the transmission signal based on a t re of noise source acquired from the receiving apparatus, to adjust the communication parameter to retransmit the transmission signal in response to the type of the noise source being an interference signal, and to adjust the communication parameter to control the data rate of the transmission signal in response to the type of the noise source being additive white Gaussian noise (AWGN).

11. The transmitting apparatus of claim 10, further comprising:
 an acquirer configured to acquire the information with respect to the type of a noise source regarding the training sequence from the receiving apparatus.

12. A communication system comprising:
a transmitting apparatus configured to control a distribution of a logic value among logic values of a transmission signal corresponding to an on-off keying (OOK) scheme or a frequency shift keying (FSK) scheme; and
a receiving apparatus configured to set a detection threshold according to the distribution of the logic value of the transmission signal, and configured to determine a type of noise source influencing a reception signal, according to the detection threshold and the distribution of the logic value of the reception signal, and to determine whether the noise source influencing the reception signal additive white Gaussian noise (AWGN) or an interference signal according to the detection threshold and the distribution of a logic value of the reception signal.

13. The communication system of claim 12, wherein
the transmitting apparatus is configured to transmit information regarding the distribution of the logic value; and
the receiving apparatus sets the detection threshold according to the information regarding the distribution of the logic value.

14. The receiving apparatus of claim 1, wherein the receiving apparatus is configured to adjust a power value of the reception value prior to the detector detecting the distribution of the logic value among the logic values of the reception signal.

15. The receiving apparatus of claim 1, wherein the detector is configured to detect a logic value '0' and a logic value '1' based on a predetermined power value or frequency value.

16. The transmitting apparatus of claim 7, wherein:
the parameter adjuster is configured to adjust the communication parameter so that the transmission unit transmits in a frequency range that does not include the interference signal.

* * * * *